United States Patent
Savenok et al.

(10) Patent No.: US 10,116,616 B2
(45) Date of Patent: Oct. 30, 2018

(54) SMART ROUTING SYNCHRONIZATION SYSTEM AND METHODS FOR SOCIALIZING A SYNTHETIC REBROADCAST AND GROUP STREAM

(71) Applicant: REMOTE MEDIA, LLC, Wheaton, IL (US)

(72) Inventors: Alexander Savenok, Grandview, MO (US); Pavel Savenok, Wheaton, IL (US); David Savenok, Wheaton, IL (US); Gregory H. Leekley, Charlotte, NC (US); Harold R. Eason, Charlotte, NC (US)

(73) Assignee: Remote Media, LLC, Wheaton, IL (US)

( * ) Notice: Subject to any disclaimer, the term of this patent is extended or adjusted under 35 U.S.C. 154(b) by 0 days.

(21) Appl. No.: 15/305,977

(22) PCT Filed: Apr. 23, 2015

(86) PCT No.: PCT/US2015/027311
§ 371 (c)(1),
(2) Date: Oct. 21, 2016

(87) PCT Pub. No.: WO2015/164613
PCT Pub. Date: Oct. 29, 2015

(65) Prior Publication Data
US 2017/0041280 A1    Feb. 9, 2017

(51) Int. Cl.
*G06F 15/16*    (2006.01)
*H04L 12/58*    (2006.01)
(Continued)

(52) U.S. Cl.
CPC .......... *H04L 51/32* (2013.01); *H04L 12/1818* (2013.01); *H04L 12/1822* (2013.01); *H04L 67/1095* (2013.01); *H04L 12/1845* (2013.01)

(58) Field of Classification Search
None
See application file for complete search history.

(56) References Cited

U.S. PATENT DOCUMENTS

| | | | |
|---|---|---|---|
| 6,990,681 B2* | 1/2006 | Wang | H04N 5/222 348/143 |
| 2002/0060750 A1* | 5/2002 | Istvan | G06F 3/0481 348/569 |

(Continued)

FOREIGN PATENT DOCUMENTS

RU    2398362    8/2010

*Primary Examiner* — Mohamed Ibrahim
(74) *Attorney, Agent, or Firm* — Christopher J. Scott

(57) ABSTRACT

Smart routing synchronization systems socialize a synthetic rebroadcast or group stream for enabling members of a user group to (re)broadcast select content to other members of the user group and collaboratively curate content delivery. The systems are based on a content-identification process and further a process for (re)broadcasting content. These processes are cooperable among a group of member clients each of which are in communication with at least two content sources. The synchronization process identifies select content and directs delivery of the content from an optimal resource for each member client via a smart routing protocol. The (re)broadcast process prompts delivery of the select content to members of the user group from a content origination member of the group, and group members are thereby able to simultaneously access the content for the purpose of providing a content-based platform for social interaction.

23 Claims, 15 Drawing Sheets

(51) Int. Cl.
*H04L 12/18* (2006.01)
*H04L 29/08* (2006.01)

(56) References Cited

U.S. PATENT DOCUMENTS

| | | |
|---|---|---|
| 2005/0286546 A1 | 12/2005 | Bassoli et al. |
| 2006/0291466 A1* | 12/2006 | May, Jr. ............ H04L 29/06027 370/390 |
| 2008/0134258 A1 | 6/2008 | Goose et al. |
| 2010/0017455 A1 | 1/2010 | Svendsen et al. |
| 2010/0304869 A1* | 12/2010 | Lee ....................... A63F 13/355 463/42 |
| 2011/0167114 A1 | 7/2011 | Blanchard, III et al. |
| 2012/0117585 A1 | 5/2012 | Curtis et al. |
| 2012/0169834 A1 | 7/2012 | Grigsby et al. |
| 2012/0177067 A1* | 7/2012 | Cho ................... H04N 21/4126 370/503 |
| 2012/0185570 A1* | 7/2012 | Bouazizi .......... H04N 21/44016 709/219 |
| 2013/0018960 A1 | 1/2013 | Knysz et al. |
| 2013/0091214 A1* | 4/2013 | Kellerman ............. G06Q 30/00 709/204 |
| 2013/0142087 A1 | 6/2013 | Hyndman et al. |
| 2013/0344862 A1 | 12/2013 | Alameh et al. |
| 2014/0046775 A1* | 2/2014 | Harb .................. G06Q 30/0269 705/14.66 |
| 2014/0132702 A1* | 5/2014 | Leibovich ............. H04N 7/157 348/14.08 |
| 2015/0358382 A1* | 12/2015 | Chen ................... G11B 27/007 709/219 |

* cited by examiner

SMART ROUTING SYNCHRONIZATION SYSTEM AND METHODS FOR SOCIALIZING A SYNTHETIC REBROADCAST AND GROUP STREAM

PRIOR HISTORY

This U.S. patent application is a 371 national stage entry of International Patent Application No. PCT/US2015/027311, which International Patent Application claims the benefit of or priority to (1) U.S. Provisional Patent Application No. 61/983,160 filed in the United States Patent and Trademark Office (USPTO) on 23 Apr. 2014; (2) International Patent Application No. PCT/US2014/069067 filed in the USPTO as international receiving office on 8 Dec. 2014, and (3) International Patent Application No. PCT/US2015/019099 filed in the USPTO as international receiving office on 6 Mar. 2015, which latter application claimed priority to U.S. Provisional Patent Application No. 61/949,493 filed in the United States Patent and Trademark Office (USPTO) on 7 Mar. 2014, which provisional patent application is related to U.S. patent application Ser. No. 13/199,474 ('474 application), filed in the USPTO on 30 Aug. 2011, now issued as U.S. Pat. No. 8,688,631; U.S. patent application Ser. No. 13/134,044 ('044 application), filed in the USPTO on 26 May 2011, now issued as U.S. Pat. No. 8,478,719; and U.S. patent application Ser. No. 13/065,254 ('254 application), filed in the USPTO on 17 Mar. 2011, now issued U.S. Pat. No. 8,589,171, the specifications of which applications are hereby incorporated by reference thereto so far as allowable.

BACKGROUND OF THE INVENTION

Field of the Invention

The present invention generally relates to expanding the social networking aspects within a smart routing system. The present invention is directed to further socializing such a synthetic re-broadcast and group streaming where the participants have multiple content or data origins

SUMMARY OF THE INVENTION

The present invention essentially concerns certain systemic means for rebroadcasting and group streaming. Rebroadcasting is basically a social feature that sees the current playback choices belonging to a member of a user group irrespective of content source and rebroadcasts those playback selections to other members of the user group which members may be within a select social circle, whether public or a private subset, or a geographically defined subset such that the select social circle can participate as members of the user group by attending to the content as initiated by the content initiator within the user group for the purpose of providing a content-based platform for social interaction.

The content sources may be user-generated direct playback selections, or may be sourced from indirect streams that are either algorithmically generated or curated by another person or group. For example, an audio source is originated from a 3rd party service and the audio signal for the rebroadcast does not have to originate from the user's own device or mobile application. The rebroadcast then provides a dialogue platform whereby the members of the group can in real-time, provide commentary by way of numerous means such as audio overlays, video overlays, or text commentary, which dialogue is intended to be based at least on the broadcast to which the members of the group are attending, thereby providing the members of the user group with both the content stream and means for social interaction based therefrom. The social rebroadcasting system according to the present invention thus contemplates a number of potential variants as discussed in more detail hereunder under the Detailed Description section of this paper.

The group streaming aspects of the present invention provide certain additional social functionality in terms of a collaboratively curated content stream optimized for a group of people listening and interacting with the same media content. Each member of the user group naturally has certain individual preferences in terms of preferred content. The individual preferences submitted by members of the user group, for example, can input preferences going to preferred artists or actors, genres, albums, movies, moods, decades, etc.

The group streaming feature according to the present invention is primarily focused upon the optimization of a collaboratively curated content or media stream for members of a user group, using multiple initial and ongoing inputs such as liking, down-voting, up-voting, etc. The prior art does contemplate certain market-located solutions that offer individual curating and stream optimization based on an individual's input. The prior art, however, perceives a need for a system that curates and optimizes a group-based content stream based on multiple inputs, and for multiple users.

The foregoing social functions, namely a social rebroadcasting system for enabling individual members of a user group to rebroadcast select content to other members of the user group irrespective of source and a group streaming system for enabling members of a user group to collaboratively curate content delivery are both subject to certain smart routing parameters that function to provide real-time synchronization of media content between at least two parties or members of the user group, which media content may be sourced from at least two separate copyright access points or environments.

Whereas previous disclosures by Applicant have focused on the synchronization of media files in Direct request cloud sources, the present invention is directed to real-time synchronization of streaming media content from at least one Indirect source to a Direct source. The present invention thus attempts to further socialize the smart routing and synchronization environment governed by certain compliance or reporting means. The ability to source an Indirect content stream with an alternative Direct source (i.e. a personal and privately owned legal source NOT delivered from a peer-to-peer or computer populated network) with a governing compliance application is believed foundational to the present invention.

In other words, a content stream provider such as a digital radio provider or another person that shares or streams content is requested by a consumer to consume content from that content stream provider. The content stream provider and the consumer each have different legally owned access points to content that is to be streamed or shared. The consumer may have a legal right to a direction request for this content from the consumer's own source, while the provider may stream content from a different source.

A direct access to the content from the consumer's own library is thus believed more efficient and cost conscious than obtaining access to the content from the provider. If the content is thus sourced from a consumer's own library, this content delivery will or should have an impact on the reporting by the content provider. The compliance appliance according to the present invention accurately tracks and reports the resulting revenue generation for copyright holders.

BRIEF DESCRIPTION OF THE DRAWINGS

Other features of our invention will become more evident from a consideration of the following brief descriptions of patent drawings.

DETAILED DESCRIPTION OF THE PREFERRED EMBODIMENTS AND METHODOLOGY

Figure 11:
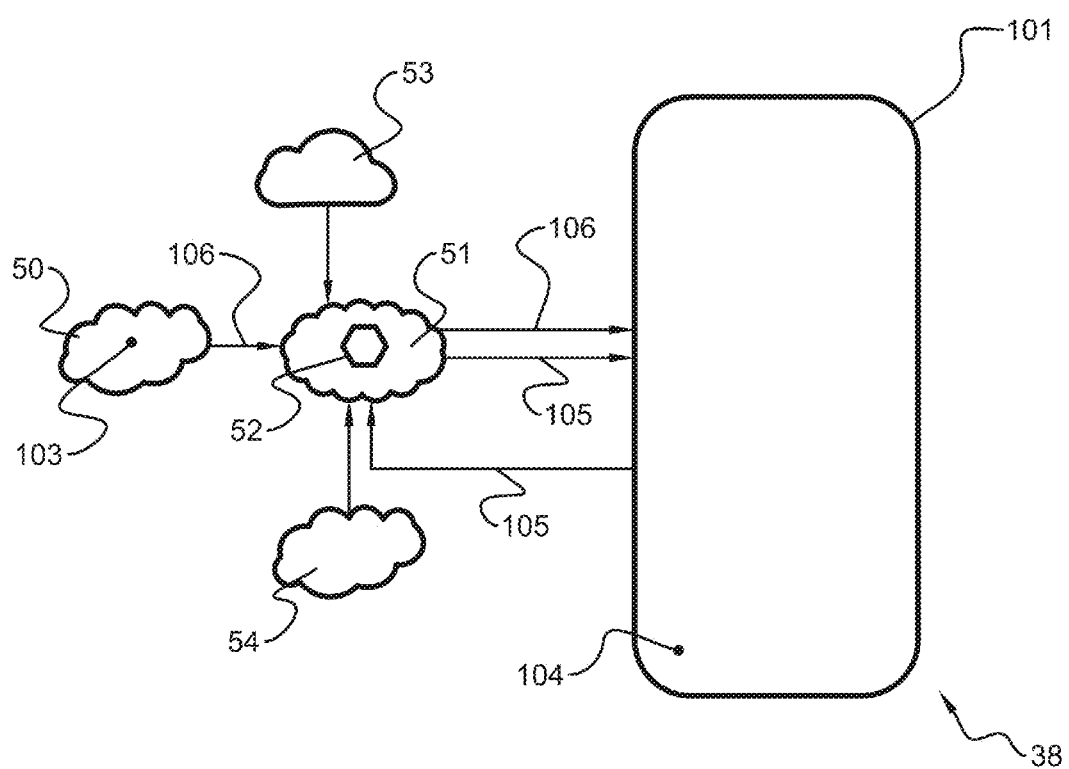
FIG. 11 is a schematic depiction of a member device in communication with a central server according to the present invention, which central server is in communication with a number of content sources, including (1) a third party cloud based digital (indirect) source; (2) a local storage (direct) source; (3) a secondary cloud based locker (indirect) source; and (4) a by request third party cloud based (indirect) source.
Figure 12:
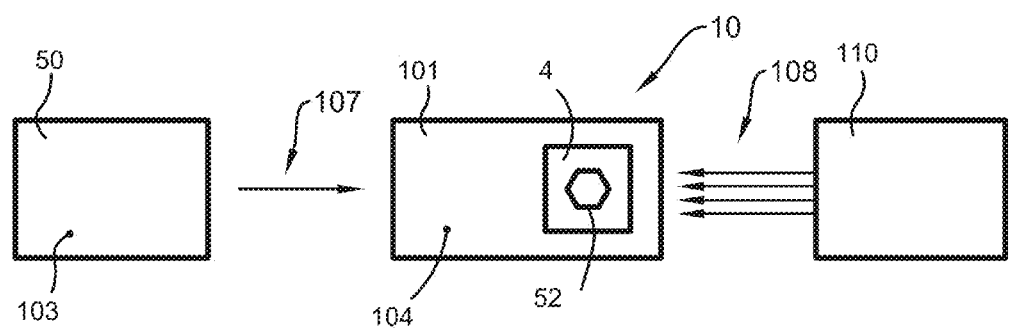
FIG. 12 is a seventh block type diagram of consumer intermediate a first content provider and a content delivery network.
Figure 13:
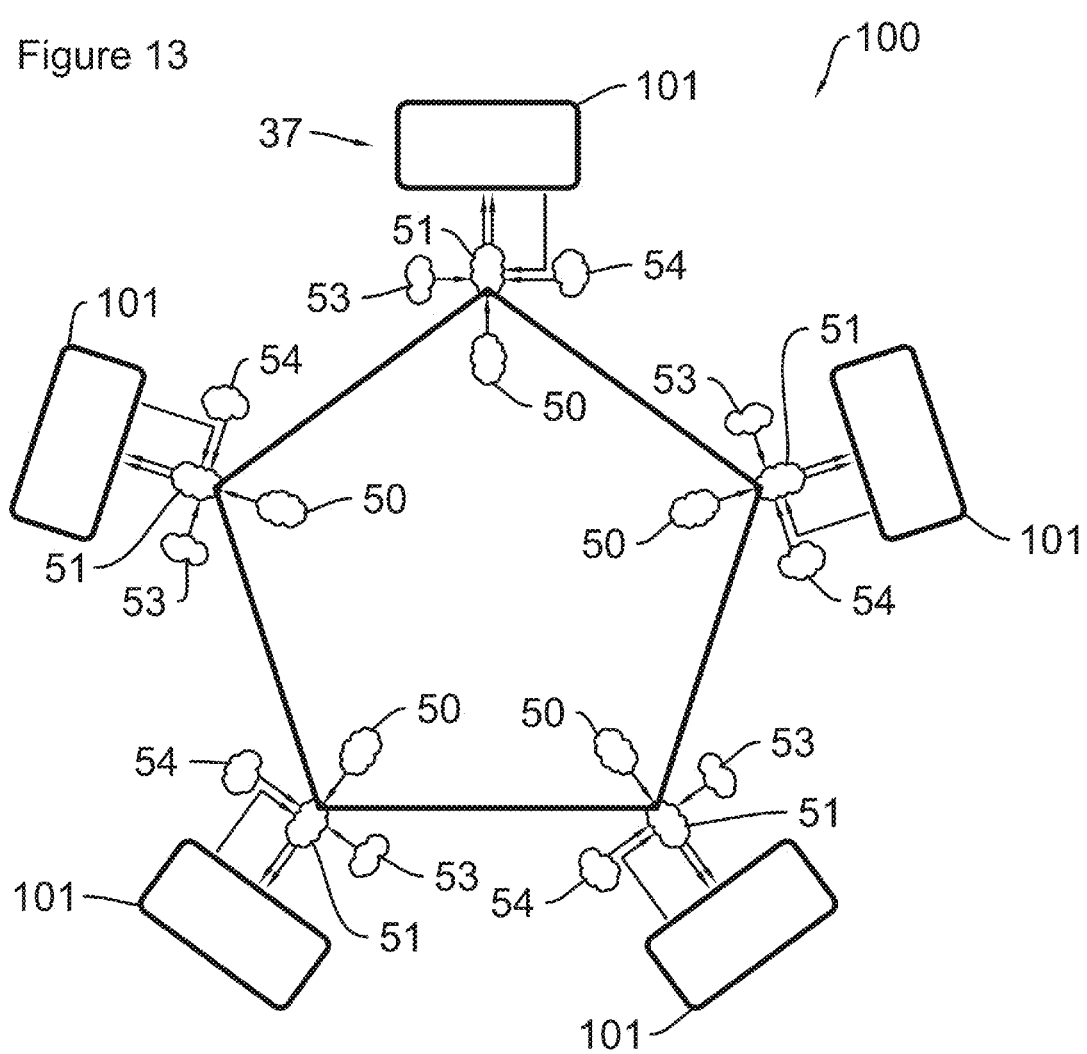
FIG. 13 is a schematic depiction of a series of member devices in a user group all linked via the central server according to the present invention, which central server is in communication with a number of content sources, including, a third party cloud based digital source; a secondary cloud based locker source; a by-request third party cloud based (indirect) source; and a local storage source.

Referring now to the drawings with more specificity, the present invention essentially concerns certain computer-implemented, systemic means for rebroadcasting and group streaming as for example through enablement by a mobile application or similar other software operable via smart phones, tablet computers, mobile devices and/or so-called smart devices such as smart televisions. As noted hereinabove, rebroadcasting may be thought of as a social feature or function that detects a member's or user's playback choices, which member is part of a user or member group as at (100) of at least two members (10). A generic mobile device is depicted at (101) in FIGS. 11 and 13, for example, and the member group (100) comprises a series of mobile devices (101) representative of individual members in the member group (100).

A content initiator or origination member of the member or user group (100) may thus initiate a rebroadcast via functionality provided by the device-enabled application or system according to the present invention to the other members of the user or member group (100) irrespective of content source. In other words, a member rebroadcasts playback selections to other members as at devices (101) of the user or member group (100), which other members may be within a select social circle, whether public or private.

It is contemplated for example, that the subset might be a group of friends, co-enthusiasts of a certain genre of music or cinema, or geographically defined subset such that the select social circle can participate as members of the user group (100) by attending to the streamed or delivered content as initiated by the content initiator within the user group for the purpose of providing a content-based or content-launched platform for social interaction.

The content sources may be user-generated direct playback selections, or may be sourced from indirect streams that are either algorithmically generated or curated by another person or group. For example, an audio source could be originated from a 3$^{rd}$ party service and the audio signal for the rebroadcast on other member devices (101) does not have to originate from the initiator's own device (101) or mobile application.

The rebroadcast then provides a basis for inter-member dialogue or a dialogue platform whereby the members of the user group (100) can, in real-time, provide commentary by way of numerous means for doing so such as audio overlays, video overlays, or text-based commentary, which dialogue is intended to be based at least on the broadcast to which the members of the group 100 are attending, thereby providing the members of the user group (100) with both the content stream and means for social interaction(s) based therefrom. The social rebroadcasting system or application according to the present invention thus contemplates a number of potential variants to achieve these ends.

Figure 1:
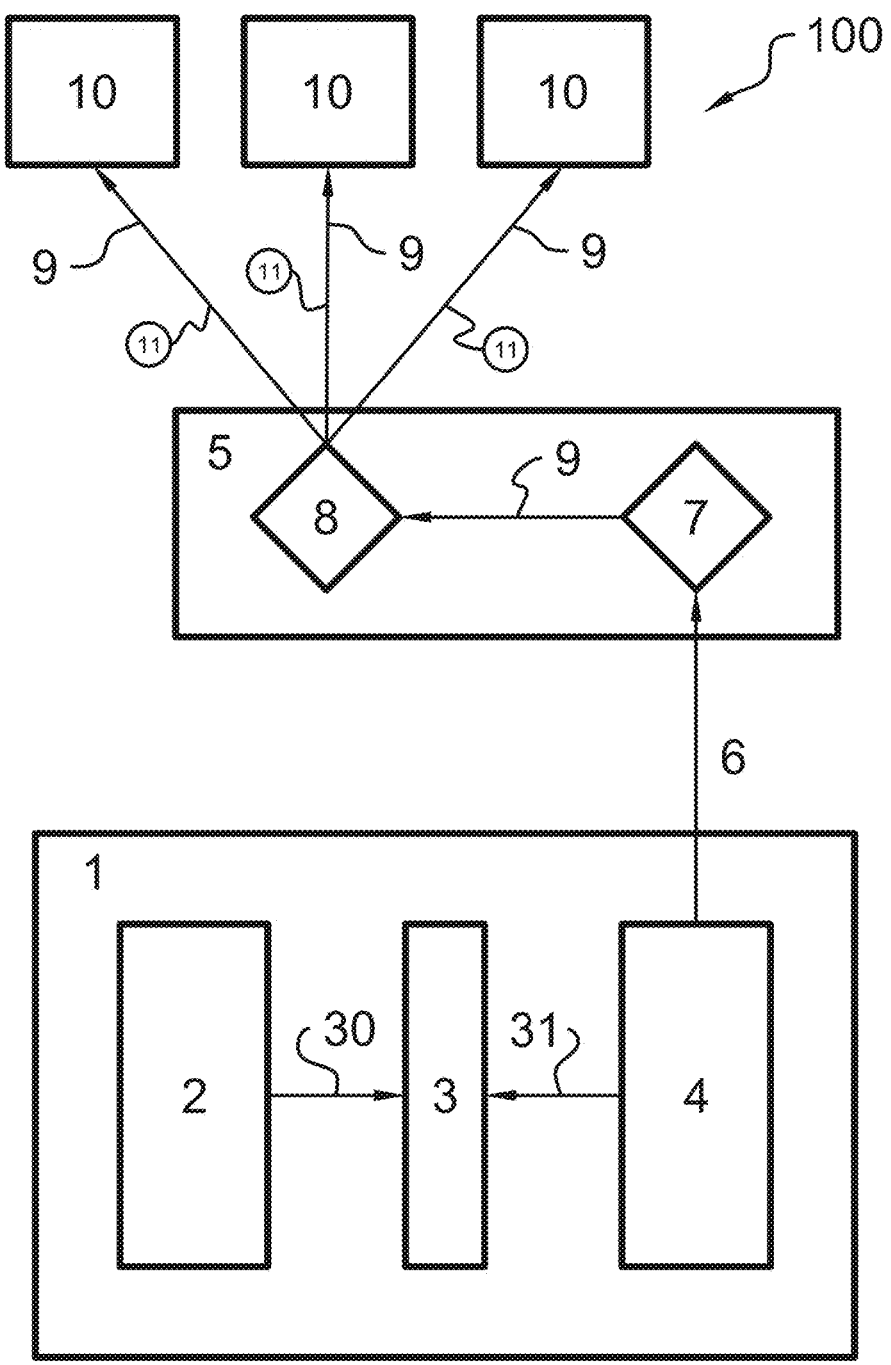
FIG. 1 is a first block type diagram of a first, file-matching version of the social rebroadcasting system according to the present invention depicting a member device in communication with other member devices of a user group via a server according to the present invention.

A file matching rebroadcasting system is generally depicted in FIG. 1. In this variant the member or user is listening to music or attending to other media content on a member device (1) via a third party application (2). The application (2) plays as at (30) the media content through the system Application Program Interface or API (3) as is common in mobile operating systems or applications. The VERTIGO branded application (4) according to the present invention may preferably request as at (31) audio waveform data of the actively playing audio from the API (3).

If the user or member enables a "broadcast my stream" function of the VERTIGO branded application (4), the application (4) delivers (6) the audio waveform data to the VERTIGO branded server (5). The VERTIGO branded server use file matching techniques (7) to identify the music being played by the user or member via the third party application (2), and then delivers (as at 9) the media content (11) to the other users or members (10) of the user or member group or selected social circle (100) preferably via a group-collaborative curating service as at (8).

Figure 2:
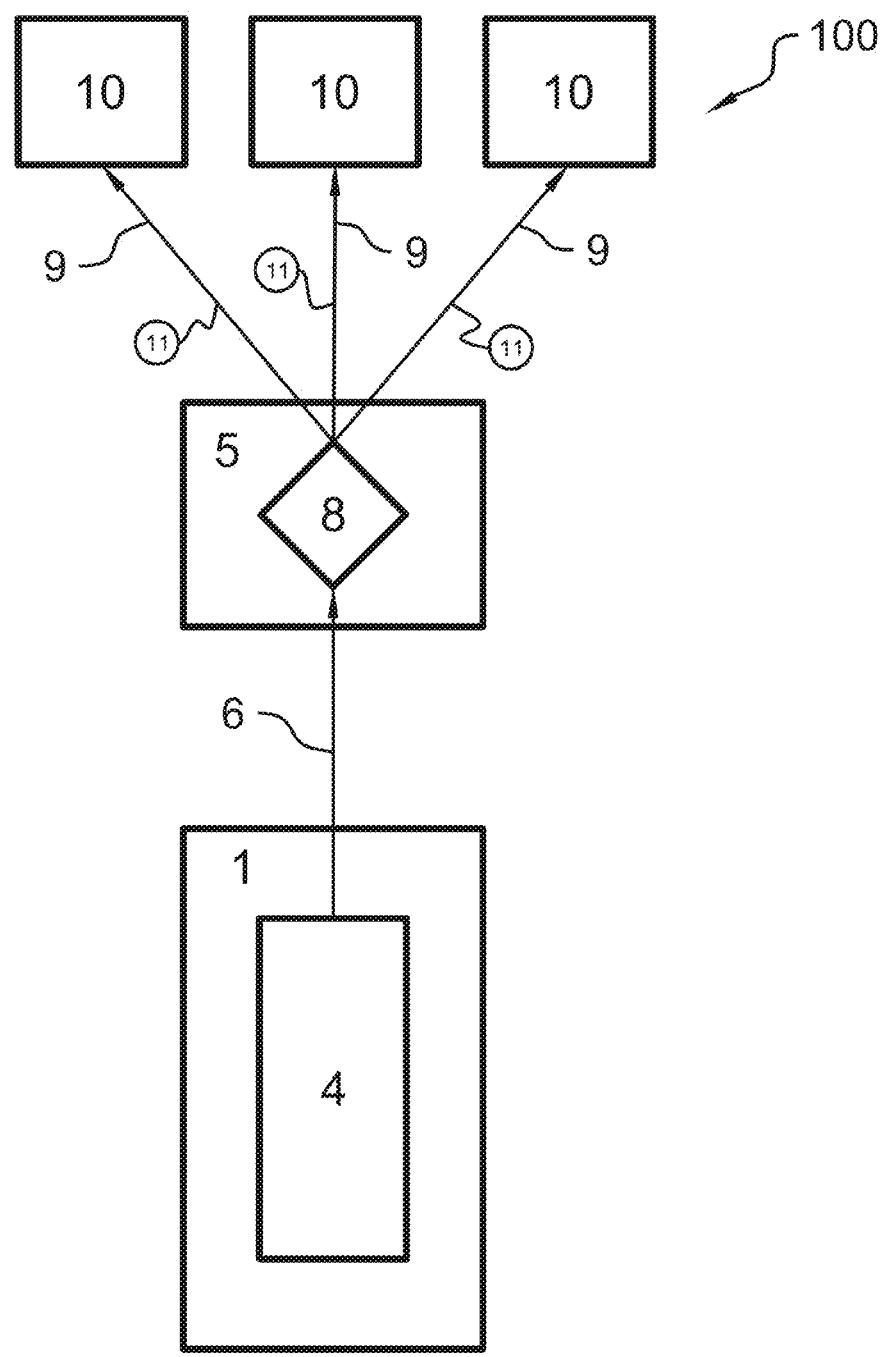
FIG. 2 is a second block type diagram of a second, In-App version of the social rebroadcasting system according to the present invention depicting a member device in communication with other member devices of a user group via a server according to the present invention.

Referencing FIG. 2, the reader will there consider a so-called "In-App" rebroadcasting system or application according to the present invention. This method or variant effects the desired functionality does not require the preferred file-matching techniques as at (7) simply because the member user created his or her playlist or selected a song from within the VERTIGO branded application (4) cooperable with the member device (1). The VERTIGO branded application (4) reports as at (6) to the VERTIGO branded curating service (8) the content (11) to which the user or member is attending, which content (11) is then re-broadcast (11) to the users or members (10) of the selected social circle or member group (100).

Figure 3:
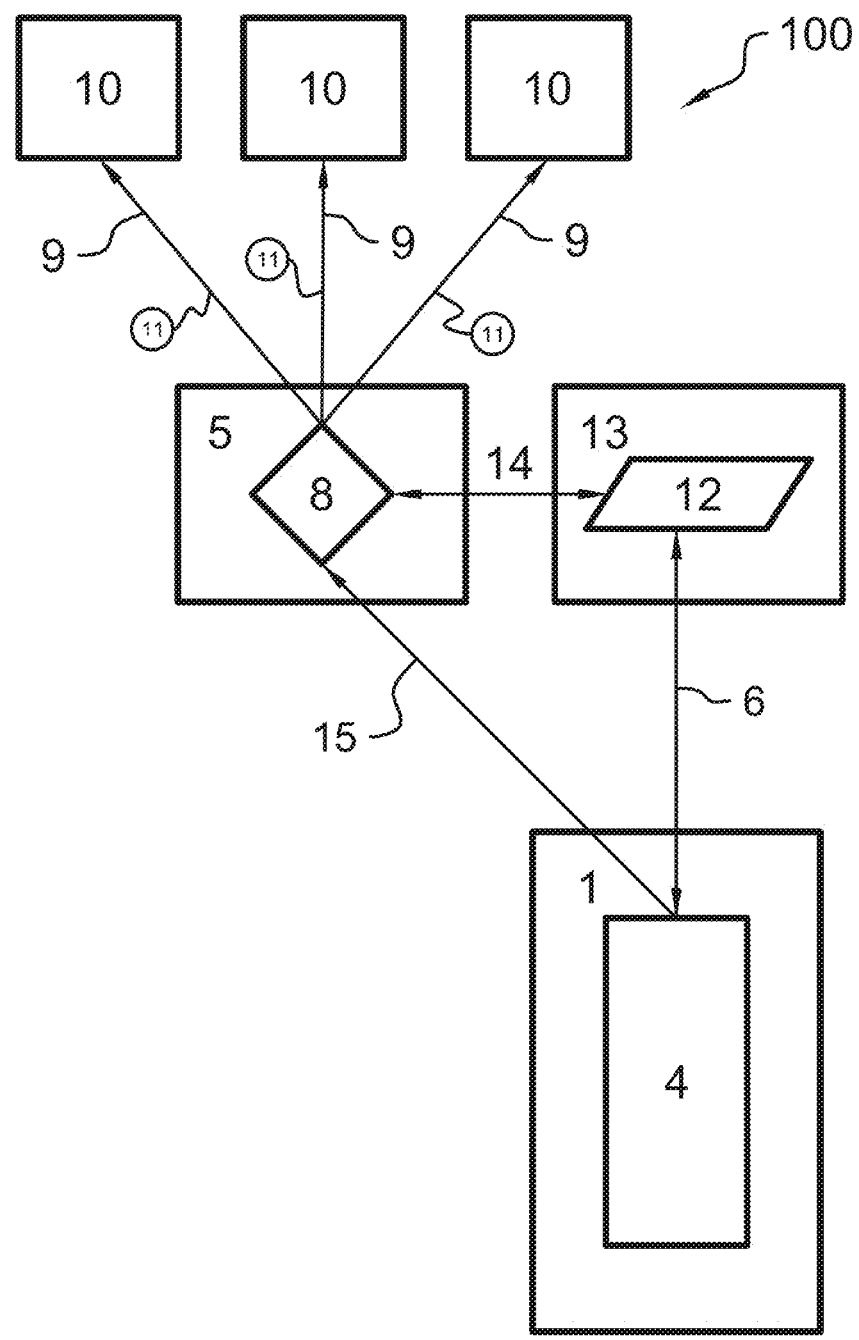
FIG. 3 is a third block type diagram of a third, HTTP redirect version of the social rebroadcasting system according to the present invention depicting a member device in communication with other member devices of a user group via a third party service provider and a server according to the present invention.

Referencing FIG. 3, the reader will there consider an HTTP-redirect type social rebroadcasting system according to the present invention. This variant of the social rebroadcasting system occurs when the user or member is using the VERTIGO branded application (4) but is attending to music or media (12) provided as at (6) by a third party service provider (13). The user or member make the playback request within the VERTIGO branded application (4), but is directed at the 3rd party service (13). The VERTIGO branded application (4) simultaneously delivers as at (15) to the VERTIGO branded curating service (8) the resource reference to the audio or media that is being requested by the user from the 3rd party service (13). The VERTIGO branded curating service (8) then requests as at (14) that resource from the 3rd party service provider (13) and delivers as at (9) the media content (11) to the users (10) within the selected social circle (100).

Figure 4:
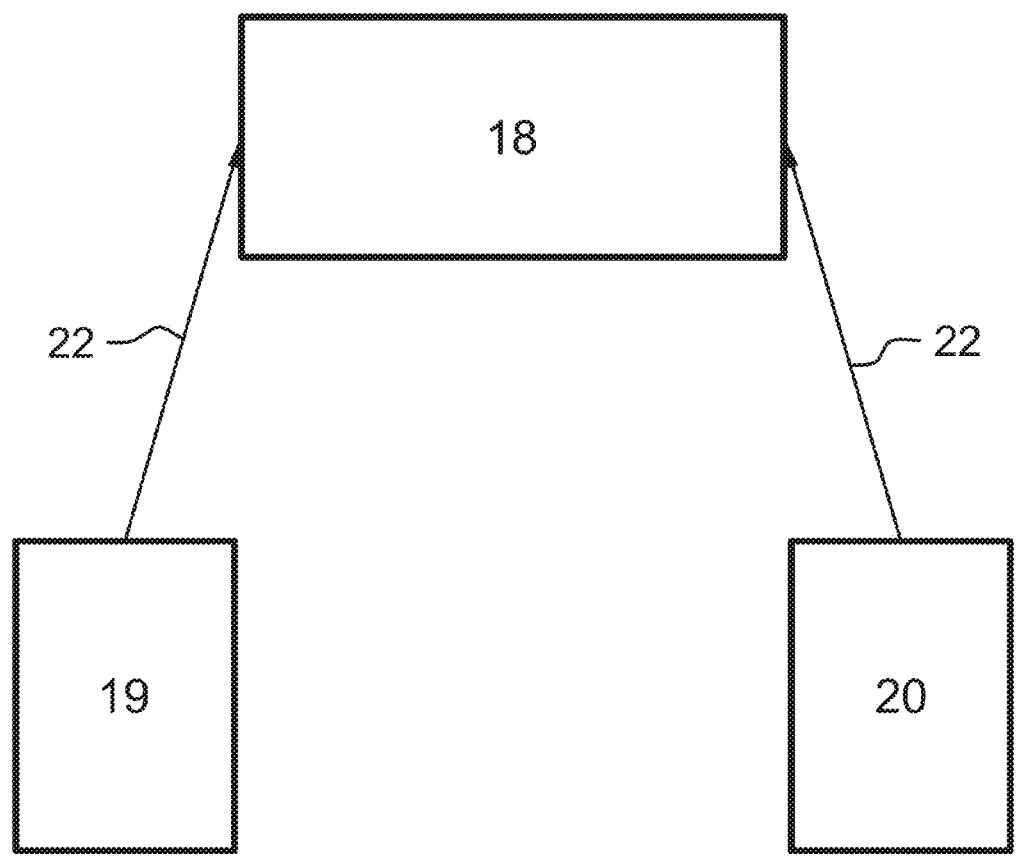
FIG. 4 is a fourth block type diagram of a third party service provider acting as an intermediary between two users of the system/applications according to the present invention.

Referencing FIG. 4, the reader will there consider third party type social rebroadcasting service or system according to the present invention. This variant centers on a third party service provider as at (18). The third party service provider (18) allows applications and/or services as at (19) to register as at (21) with the service provider (18). The song or media content that is being played by a user or member, and the user's current position within that media content or song (as updated intermittently via applications/services (19)), so that another unrelated applications/services (20) can retrieve the media content being consumed by the user to rebroadcast as at (22) to the end user of applications/services (20).

Another possible variant of the social rebroadcasting system according to the present invention not specifically illustrated or depicted contemplates the recordation and rebroadcast of the user's audio stream. This approach is less preferable insofar as it is anticipated that mobile bandwidth will suffer, and certain privacy concerns may also arise, particularly if the application cannot discern between media content (e.g. music) and simple audio output from a phone call, for example.

Figure 5:
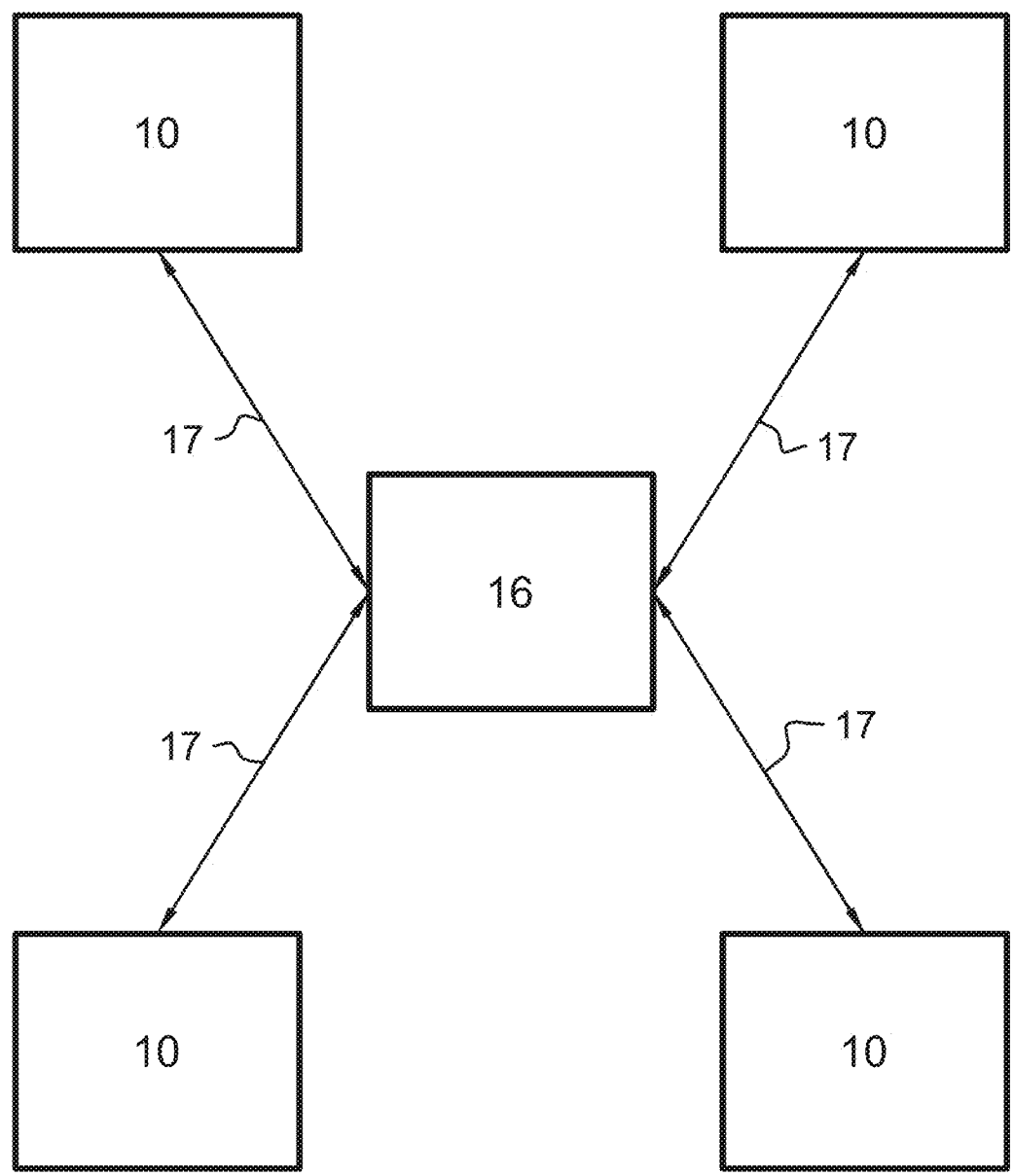
FIG. 5 is a fifth block type diagram of a group streaming system according to the present invention depicting members of the user group interconnected via the group streaming system or application according to the present invention.

The group streaming system, application or feature according to the present invention is primarily focused upon the optimization of a collaboratively curated content or media stream for members (10) of a user group as at (100). Referencing FIG. 5, the reader will there consider that members or group stream participants as at (10) of the user group input as at (17) user preferences into a collaborative group streaming curation compiling service, system, or application as at (16).

Figure 6:
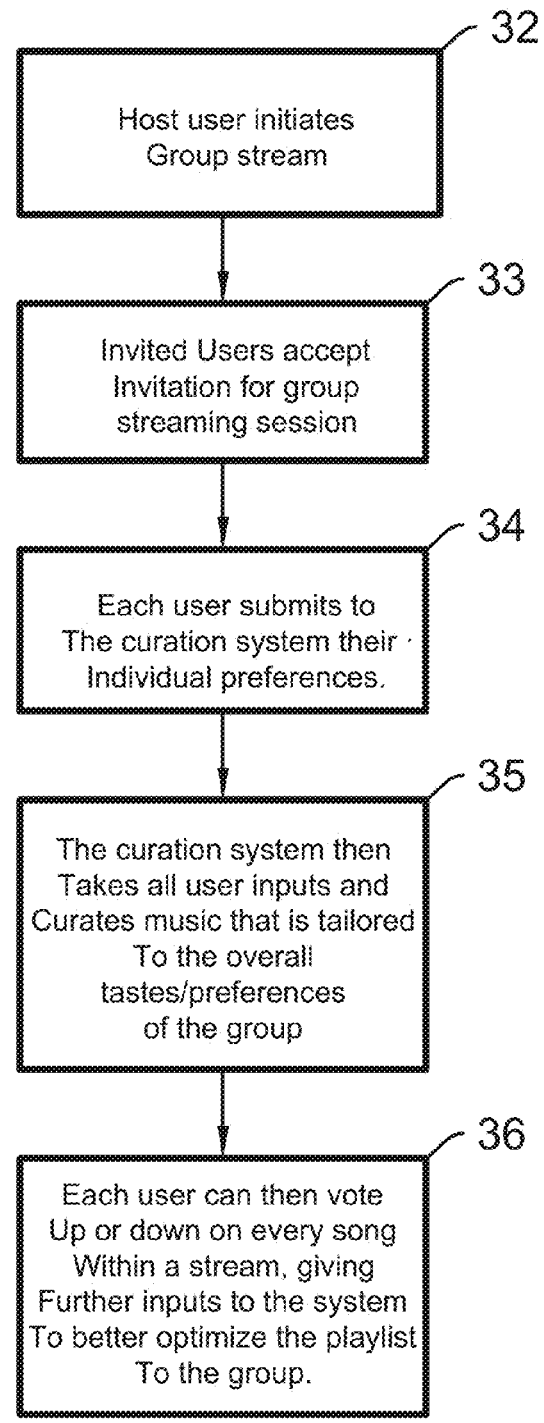
FIG. 6 is a flow chart type diagram of a group streaming methodology according to the present invention showing detail-enhanced virtual file system structure as compared to the system shown in FIG. 4 depicting a media player and two remote data sources in communication with a virtual file application according to the present invention.

Referencing FIG. 6, the reader will there consider a generalized flowchart depicting the processes or methodology of group streaming according to the present invention. The group streaming method according to the present invention is believed to basically function to enable members or participants as at (10) of a user group as at (100) to collaboratively curate content delivery. The methodology may be said to preferably comprise the steps of: initiating a collaboratively curated group stream by inviting potential members of a user group to join the user group as generally depicted at (32).

Invitations to the collaboratively curated group stream may then be individually and respectively accepted by the potential members of the user group who, upon acceptance, thereby join the group stream and become members of the user group (100) as generally depicted at (33). Each user or member (10) then individually and respectively inputs (17) his or her user preferences into a group curation system or application (16) as generally depicted at (34).

The group curation system or application (16) compiles the individually and respectively input user preferences into what may be referred to as a group curation profile thus custom-tailoring media content to the overall tastes or preferences of the user group (100) as generally depicted at (35). The media content is then delivered to the members (10) of the user group (100) as initially defined by the group curation profile.

The group streaming methodology according to the subject invention further contemplates functionality that operates to continually or periodically update the group curation profile by soliciting and accepting refinements to the group curation profile. In other words, by individually and respectively updating the group curation profile with periodic additional input by individual users as they navigate through sequential content deliveries, the group curation profile and delivery of media content is thereby optimized as generally depicted at (36). In other words, by using multiple initial and ongoing inputs as at (17) such as "liking" or up-voting, down-voting, etc. . . . ), the individual members or participants may thus refine the group curation profile.

As earlier indicated, both the social rebroadcasting system or application and the group streaming system or applications according to the present invention preferably further comprise some formal means for enabling inter-member communications based at least upon the delivered or shared content. Accordingly, it is contemplated that a live audio overlay function may be preferably incorporated in which members (10) of the user group (100) can converse (as in a conference call) with their audio streams overlaid a curated (algorithmically or manually curated) audio or media stream.

In keeping with this notion, certain In-Stream social interaction is further contemplated as part of the audio overlay functionality. In other words, it is contemplated that both the social rebroadcasting and group streaming systems or applications according to the present invention may enable the user or member (10) to provide commentary on the media content in-stream or mid-stream, so to speak. Thus, in this regard, commentary may by tied or directed to a specific point (e.g. a lyric) within the song or line from a movie. It is contemplated that in addition to audio overlay, the commentary can be presented in text or video formats. Preferably, the systems can provide limits on the length and/or placement of the comments made to follow certain protocols with regard to use/playback of the content.

The present invention further contemplates a social mode function, whereby the systems are activated by "social mode" physical orientation of the member device (101). When the user or member (10) desires to interact socially with any song or media file that is playing either by commenting, or rebroadcasting, the user or member may reorient the device into a horizontal orientation as generally depicted at (37) in FIG. 13 from a vertical orientation as generally depicted at (38) in FIG. 11.

By reorienting the member device (101) into the horizontal orientation (37), the "social mode" is activated and the device (101) interacts with the audio wave form and locates other members (1) who have commented on or are listening to the song or otherwise attending to the content with which the user or member (10) is currently interacting. This allows the user to interact with the media immediately no matter where the user was previously located within the application. All of these features are accessible when in the social mode, which mode is preferably activated by gyroscopic means cooperably associated with the device (11), which means operate to detect a horizontal device position (37), and switch the application into social mode.

The present invention further contemplates extending and/or embracing certain concepts set forth and more fully articulated in International Patent Application No. PCT/US2015/019099 directed to a geographically determined or fenced broadcast stream or group stream. As an extension of the '099 Application, which application focused, in part, on streaming into geo fenced locations, the present invention contemplates an ability to stream broadcasts (live or programmed) into specific geo-fenced locations, creating exclusive destinations where a live event or broadcast or curated radio broadcast is streamed.

In order for a user or member (10) to be involved in social activity such as sharing, commenting, liking, etc. while simultaneously communicating via a mobile device (101) and operating a vehicle (e.g. automobile, motorcycle, etc.), the user or member (10) must first be able to steer the vehicle uninterrupted and safely. Thus, in most instances, use of the mobile or member device (101) must be hands-free.

To use a mobile or member device (101 while engaging in social media activity (e.g. sharing music or media, liking, commenting, inviting, etc.) via the member device (101), the user or member (10) requires a means to activate a social action (such as commenting, liking, sharing, etc.) by simply motioning with a user's fingers or hand or via some form of voice-activation so that the user's hands are not interrupted, impaired, or distracted from the primary activity of driving/steering.

In this regard, the social rebroadcasting and group streaming systems according to the present invention preferably comprise certain voice, hand or finger-operable means for activating or initiating the systems that are made cooperable with a vehicular setting for enabling the user to quickly and safely initiate the social rebroadcasting and group streaming system(s) or VERTIGO branded application (4) linked to the member device (101), for example, via Bluetooth technology or similar other wireless linkage.

Figure 7:
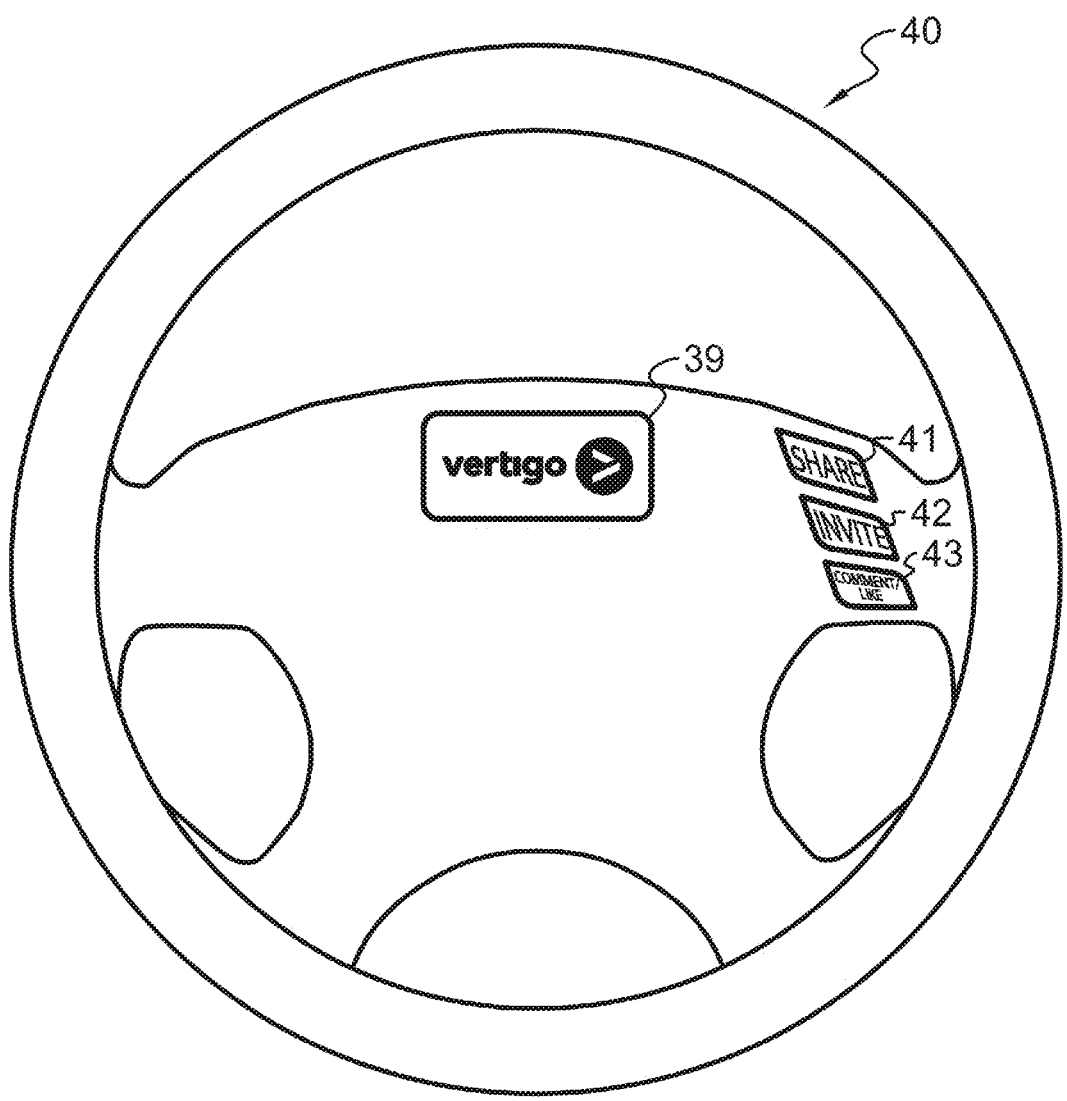
FIG. 7 is a depiction of a vehicular steering wheel construction outfitted with a Vertigo brand and several buttons marked with SHARE, INVITE, and COMMENT/LIKE for enabling a user to depress a select button from the group of buttons according to the concepts of the present invention.
Figure 8:
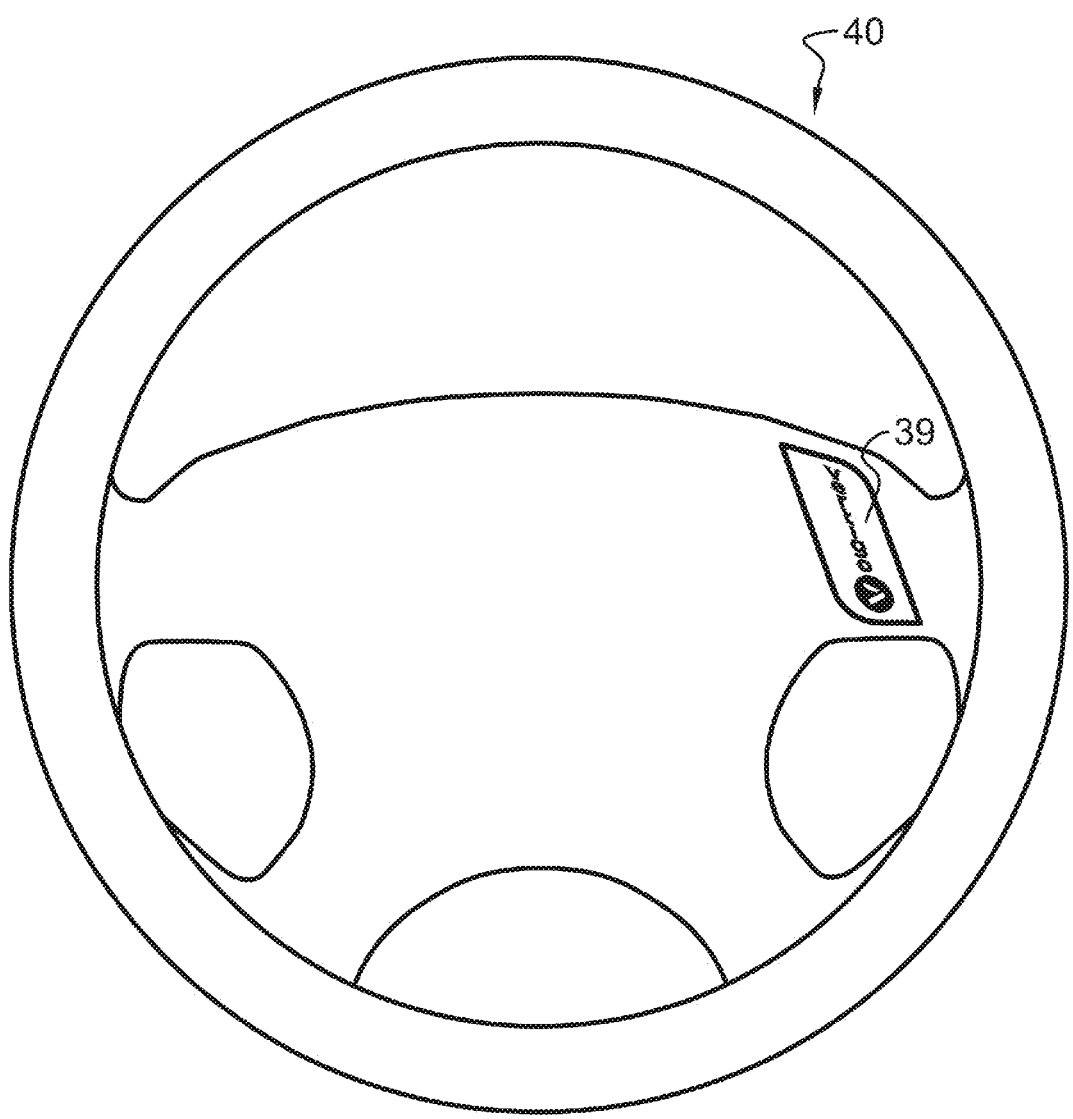
FIG. 8 is a depiction of a vehicular steering wheel construction outfitted with a Vertigo branded button for enabling a user to depress said button according to the concepts of the present invention.
Figure 9:
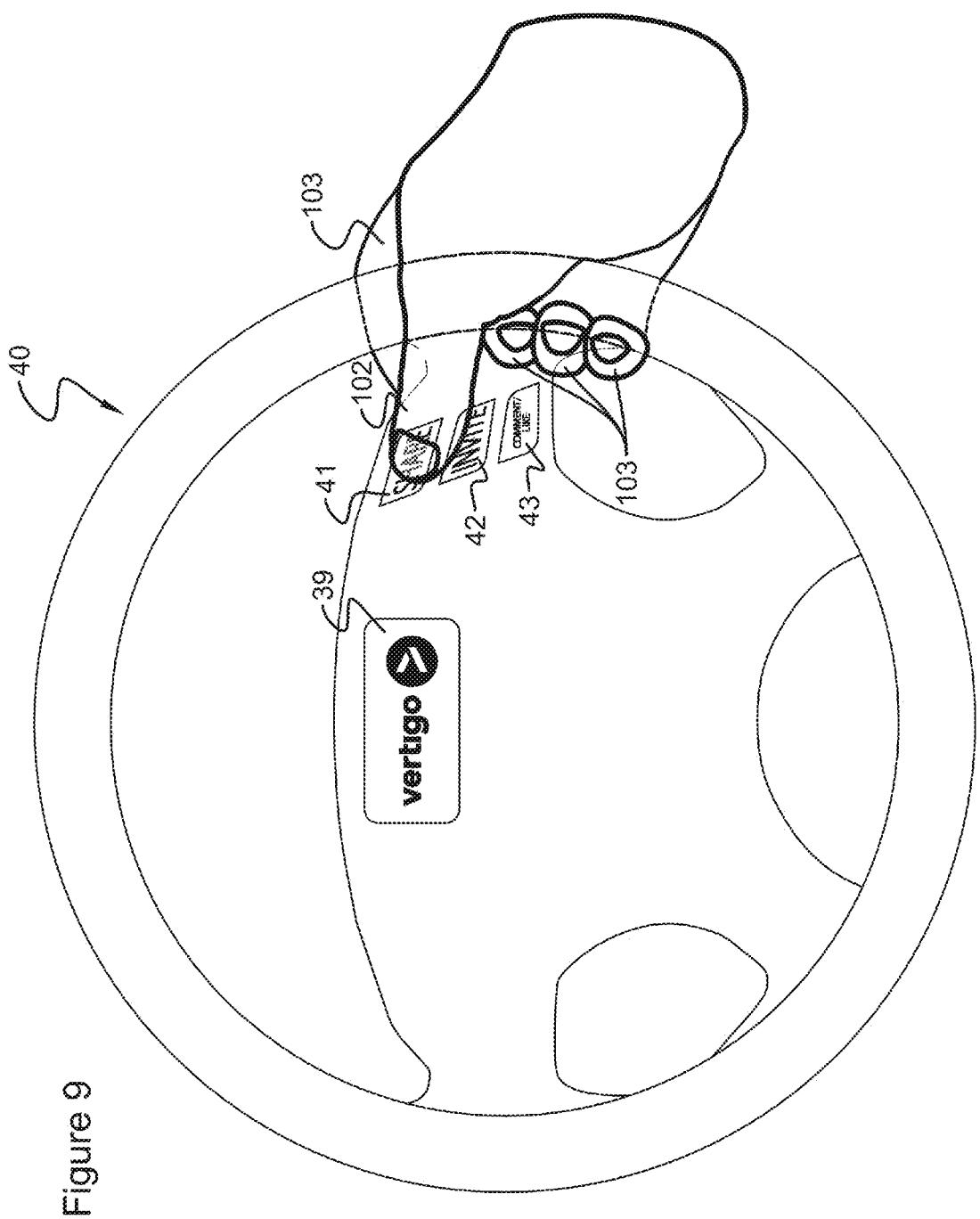
FIG. 9 is a depiction of a vehicular steering wheel construction outfitted with a Vertigo brand and several buttons marked with SHARE, INVITE, and COMMENT/LIKE for enabling a user to depress a select button from the group of buttons according to the concepts of the present invention and a diagrammatic hand shown depressing the select button.
Figure 10:
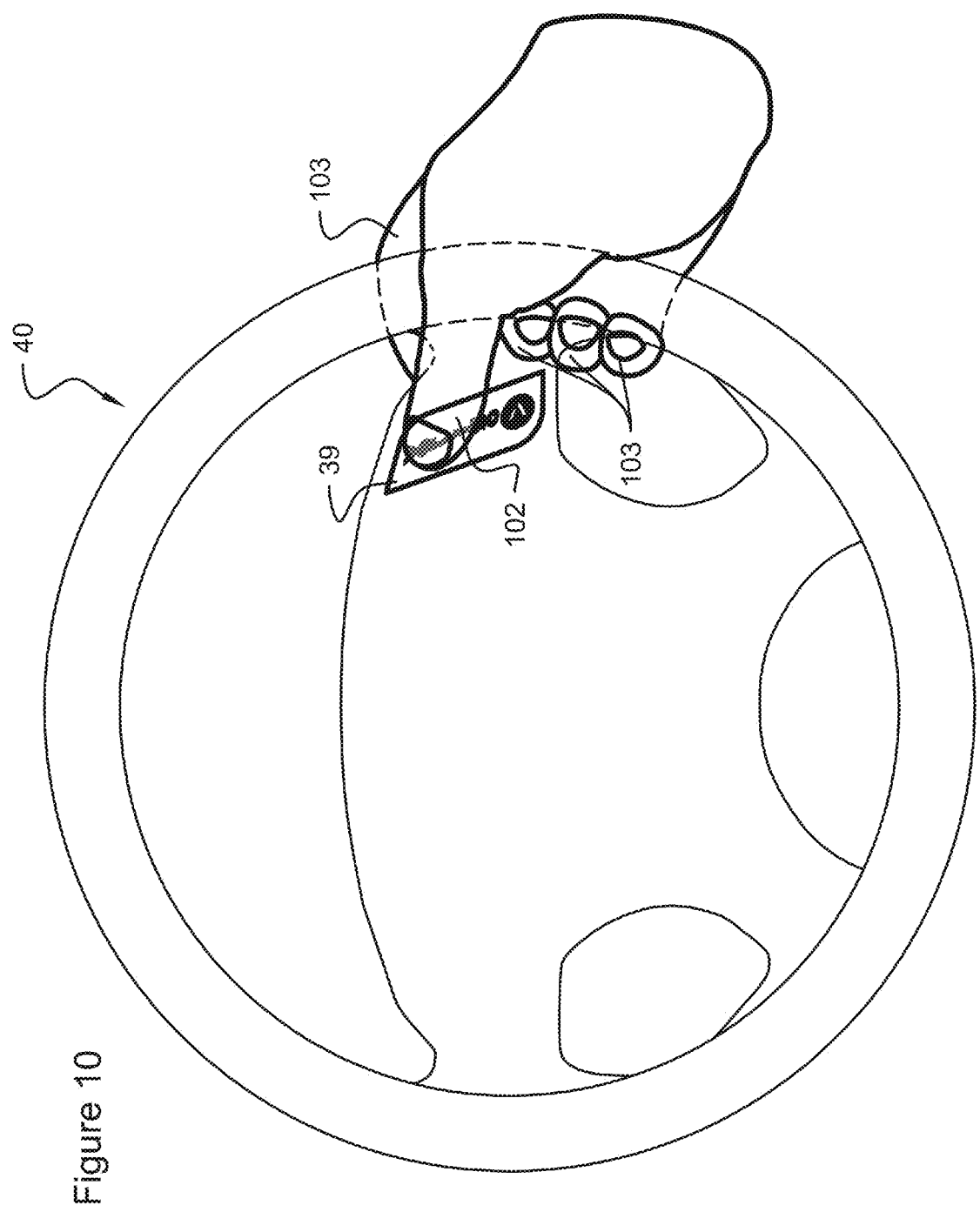
FIG. 10 is a depiction of a vehicular steering wheel construction outfitted with a Vertigo branded button for enabling a user to depress said button according to the concepts of the present invention and a diagrammatic hand shown depressing the said button.

The reader is thus directed to FIGS. 7-10, which figures generally depict a steering wheel as at (40) with variously outfitted with wheel-mounted buttons for initiating (a) the VERTIGO branded application (4) via a VERTIGO branded button (39) as generally depicted in FIGS. 7-10; or (b) various features of the VERTIGO branded application (4) such as sharing as at button (41); inviting as at button (42); and commenting/liking as at button (43) as generally depicted in FIGS. 7 and 9.

Accordingly, the social rebroadcasting and group streaming systems according to the present invention are believed preferably made operable or activated when based in vehicular settings via (VERTIGO branded) Social Media Engagement Button(s) as at (39), (41), (42), and (43) located on a vehicles (automobile, motorcycle, etc.) steering mechanism (e.g. a steering wheel as at (40), steering axle, etc.). The Social Media Engagement Button(s) as exemplified at buttons (39), (41), (42), and (43) are contemplated preferably placed upon the steering mechanism as exemplified by wheel (4) such that the buttons (39), (41), (42), and (43) are within reach of a user's thumb(s) as at (102) or any finger as at (103). Once a select button is engaged, all social activity such as commenting, sharing, liking, etc. may be further preferably activated by voice-activated commands or based on the number of clicks (e.g. single-click, double-click, etc.), preprogrammed to indicate a command for a social activity/action (e.g. comment, share, like, etc.).

It is noted that most modern vehicles outfitted with automatic transmissions allow one (left) foot to be "free" during vehicular operation. This means that left foot of the driver could be used for other, nonessential activities like clicking, tapping, music beats etc. This invention further envisions a built-in device or separate (detachable) remote/wireless device or wired device in communication with or otherwise connected to a mobile communication device as at device (101) or built-in communication means, designed for operability via a driver's free (e.g. left) foot as means of social media/other communications. This particular concept has not been specifically illustrated as such, but is believed inherently embraced by the exemplary steering wheel mechanism outfitted with hand-operable buttons as described hereinabove and supported by FIGS. 7-10.

Further, the foot-operable means for activating the various features of the present invention may be provided in the form of a built-in push/tap button located under the left foot of the driver conveniently located on the floor of the vehicle, which button may be either remotely/wirelessly communicated with a member device (101) or hard wired to the member device (101) or built-in communication means within the vehicle. The foot-operable button may preferably comprise adjustment means in order to place the button in a more proper location or position to fit the particular operator.

The foot-operable button may preferably be utilized to enable functionality via a number of clicks/taps to communicate different commands such as sharing for a one-click operation or liking for a two-click operation. Just as the wheel mechanism (40) may comprise a series of buttons for enabling hand-actuable functionality; it is further contemplated that the foot-actuable means may further comprise a separate, removable push/tap button device positionable on the floor of the vehicle or other place to act as means of social media/other means of communication. This separate, removable push/tap button device may be remotely/wirelessly connected to a mobile communication device such as device (101) or alternatively connected to built-in communication means. The separate/removable push/tap button device may also preferably use a number of clicks/taps to communicate different commands such as sharing functionality via one click, and liking functionality via two like-two clicks.

The foregoing systemic aspects according to the present invention, including both (a) the social rebroadcasting aspects for enabling individual members of a user group to rebroadcast select content to other members of the user group irrespective of source, and (b) the group streaming system for enabling members of a user group to collaboratively curate content delivery are both subject to certain smart routing parameters that function to provide real-time synchronization of media content between at least two parties or members of the user group, which media content may be sourced from at least two separate copyright access points or environments.

The so-called smart routing techniques contemplated by the present invention are more fully articulated in the specifications associated with International Patent Application No. PCT/US2014/069067 ('067 Application), which specifications of which are hereby incorporated by reference thereto. Summarizing so-called smart routing in connection with the systems of the present invention, if a user or member (10) is prompted from either a rebroadcast stream or a group stream with a request to play a song or other media file that the user or member (10) already owns or to which the user or member has legal access, the VERTIGO branded server (5) and application (4) serves the song or media file that the user either owns, or has access to as a result of a subscriptions service instead of streaming the content from a third party service provider.

The '067 application provides for an Indirect source of copyrighted media to be routed and consumed via a second Direct request source of the same copyrighted media. The effect of such routing is to create a synthetic broadcast where the originating source of the media ("Indirect Source") is not actually sent through to the media consumer but rather the consumer's own separate legally compliant "direct" access point and source of the very same copyrighted material is delivered instead.

An "Indirect Source" may be defined as any source where the consumer is not "directly" selecting the specific media to be consumed but that media selection is coming from a second "Indirect Source" whether that source is a computer-curated stream such as a digital "radio" provider or an individual live curator. Such routing or syncing of an Indirect source to a separate Direct compliant source would uniquely enable a legal and compliant collaborative listening or viewing experience of media between two or more people (i.e. a group) when and where the access to the copyrighted material is derived from two plus separate compliant media sources of that material. The present invention builds upon these concepts by providing smart routing synchronization systems and methods for socializing a synthetic rebroadcast and group stream (emphasis added).

The identification of the song or media file is preferably achieved by way of certain file-matching techniques utilizing waveform metrics of the content to quickly and accurately identify the media content, and a match inquiry is made via the VERTIGO branded application (4) to determine whether the media content can be delivered from a source directly associated with the member (10) and if so from which source associated with the member, and if not, whether any alternative more efficient sources may be available to the particular member.

The smart routing and compliance features of the present invention thus eliminate the unnecessary delivery of content already more efficiently and previously acquired or accessed by the user or member, and simultaneously protect the copyright holders from misappropriation of their intellectual property. Whereas previous disclosures by Applicant have focused on the synchronization of media files in Direct request cloud sources, the present invention is directed to real-time synchronization of streaming media content from at least one Indirect source to a Direct source. The present invention thus attempts to further socialize the smart routing and synchronization environment governed by certain compliance or reporting means.

The ability to source an Indirect content stream with an alternative Direct source (i.e. a personal and privately owned legal source that is NOT delivered from a peer-to-peer or computer populated network) with a governing compliance application is believed foundational to the present invention. Referencing FIG. 11, the reader will there consider a schematic in support of these concepts. A content stream provider such as a third party cloud-based digital radio provider or source or another similar party that shares or streams content is generally depicted and referenced at (50) with a governing VERTIGO branded server/application generically referenced at (51). That content stream provider (50) is requested by a consumer as at member device (101) to consume media content from that content stream provider (50).

It will thus be understood that the content stream provider (50) and the consumer at member device (101) each have different legally owned or copyright access points as at access point (103) versus access point (104) to the content that is to be streamed or shared. For example, the consumer as at member device (101) may have a legal right to a direct request for this content from the consumer's own source housed or stored upon the member device (101) at access point (104) while the content stream provider (5) may stream content from a different source as at access point (103).

Direct access as at arrows (105) to the content from the consumer's own library is thus believed more efficient and cost conscious than obtaining access as at arrows (106) to the content from the content stream provider (50). If the content is thus sourced from a consumer's own library or access point (104), the content delivery at arrows (105) will or should have an impact on the reporting otherwise required by the content stream provider (50). The compliance appliance (52) made operable via the VERTIGO branded server/ application (51) according to the present invention accurately tracks and reports proper revenue generation for copyright holders.

It will thus be understood given the data origin-agnostic character of the systemic aspects of the present invention, a data-routing governance system or is believed critical to protect copyright holders while simultaneously increasing efficiency of content delivery. The data-routing governance system according to the present invention preferably comprises, in combination, a data-routing compliance appliance or engine (52) and the described smart routing system. Accordingly, the data-routing compliance appliance (52) is in communication with the smart routing system, which smart routing system makes most efficient use of a plurality of data sources, which sources comprise or store data files or media content for streaming the users or members (10) of the user group (100).

The content delivery network of the smart routing system delivers select data files or media content to an end user or member (10) from an optimal data source location, which optimal data source location is selected from a group consisting of data sources such as the content stream provider (50); a secondary cloud based locker as at (53) such as iTunes Match; a second third party cloud-based content provider as at (54) such as SPOTIFY; and the local storage or access point (104). The compliance appliance or engine (52) according to the present invention further provides (a) industry rights management (b) compliance monitoring and/or (c) compliance reporting of data file transmissions.

Essentially, the present invention may be said to provide functionality for preferably (as at arrow (107) (1) delivering an indirect request stream from a local server (e.g. digital radio as exemplified by PANDORA® RADIO); (2) delivering an indirect request stream from a second direct request source (e.g. ITUNES MATCH or SPOTIFY or cloud locker like DROPBOX or any media in the cloud); (3) delivering a direct request stream from a second direct request source based upon (a) price efficiency or (b) sound quality of source; or less preferably or alternatively as at arrows (108) (4) delivering an indirect request stream from a peer-connected server based on a second direct request source's right to play or stream; (5) delivering an indirect request stream from a peer-connected server as at (110); and (6) delivering a direct request stream from a peer-connected source based upon a second direct request source's right to play or stream.

The social rebroadcasting and group streaming systems or applications according to the present invention are believed further preferably cooperable with technology providing geographic media distribution zones that work together with a media synchronization system, allowing for purchases in a geographic region to be synchronized to users' devices and libraries without the requirement for carrying out physical media. A contemplated use or application of this aspect of the present invention is the creation of geographic regions with a retailer's physical building (i.e. the distribution zone is defined as the walls of the store).

For example, the system allows users or members (10) to have special streaming and sampling access while they are within the store. A user or member (10) of a group (100) as defined by unassociated shoppers located with the confines of a store may thus be allowed to stream audio for free and fully as long as they are with the limits of the store, or read a book without constraints as long as they are with the limits of the store, or watch a movie without constraints as long as they are with a stores limits.

As soon as the user or member (10) (or more accurately, the mobile or member device 101)) leaves the store the access is restricted and the user or member (10) can only listen to content previously purchased or to which they have access via the Internet (i.e. the special access to media is only be given with the limits of the store). If a user or member is within a store and hears or reads something that they want to purchase, they can immediately make a purchase within the application, and their purchase is synchronized to all of their devices via VERTIGO branded synchronization services described elsewhere. The retailer receives payment for the media that was sold either directly or via transfer from those patented systems. It is noteworthy that the system is not bound strictly to audio, but any form of media (video, audio, books, etc. . . . ).

Figure 14:
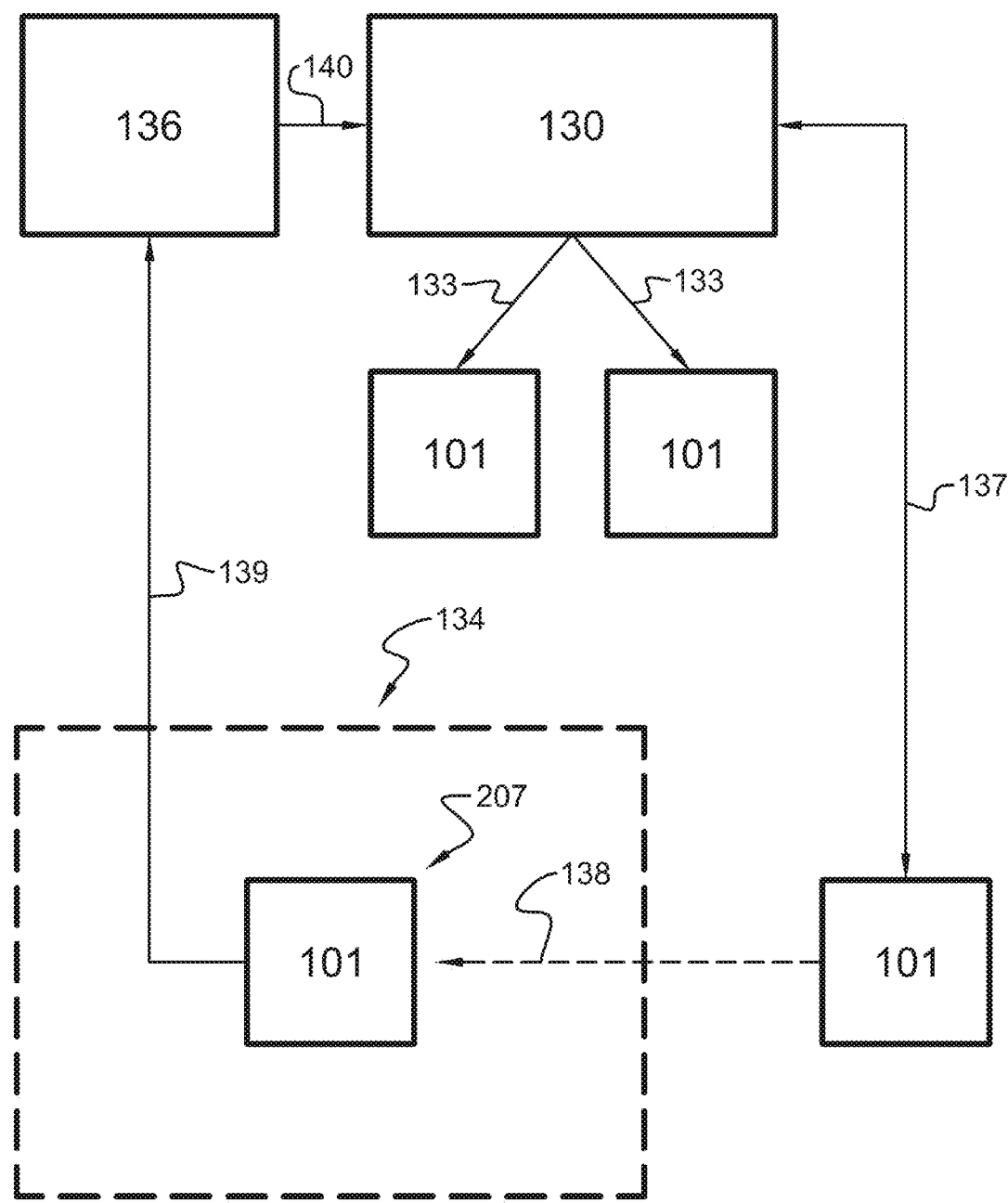
FIG. 14 is a sixth block type diagram showing a basic arrangement of a remote synchronization service in communication with a transaction service and with separate mobile devices in communication therewith.
Figure 15:
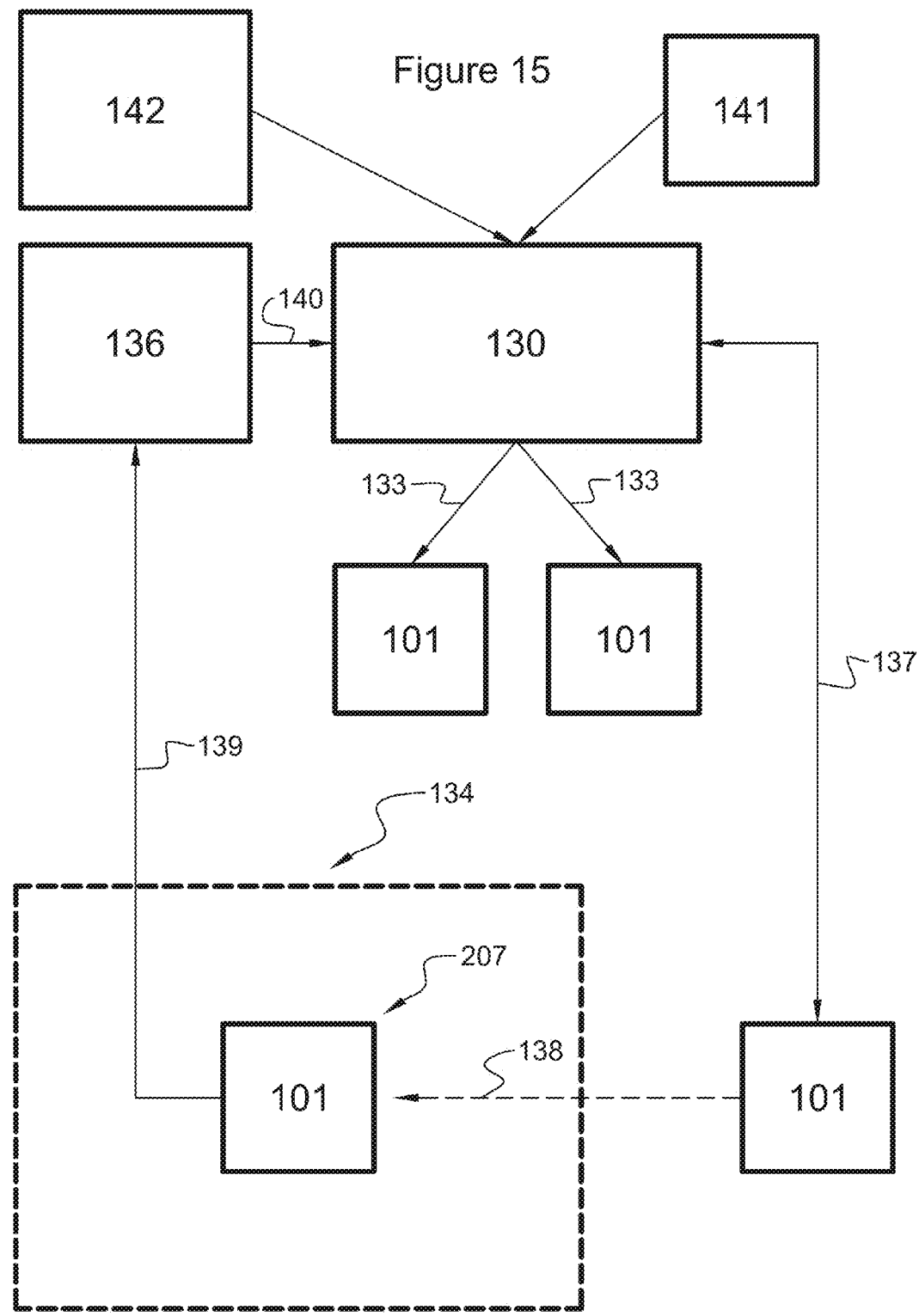
FIG. 15 is a seventh block type diagram showing the basic arrangement of a remote synchronization service in communication with a transaction service and with separate mobile devices in communication therewith otherwise shown in FIG. 14 whereby the remote synchronization service is in further communication with other sources as exemplified by retailers.
Figure 16:
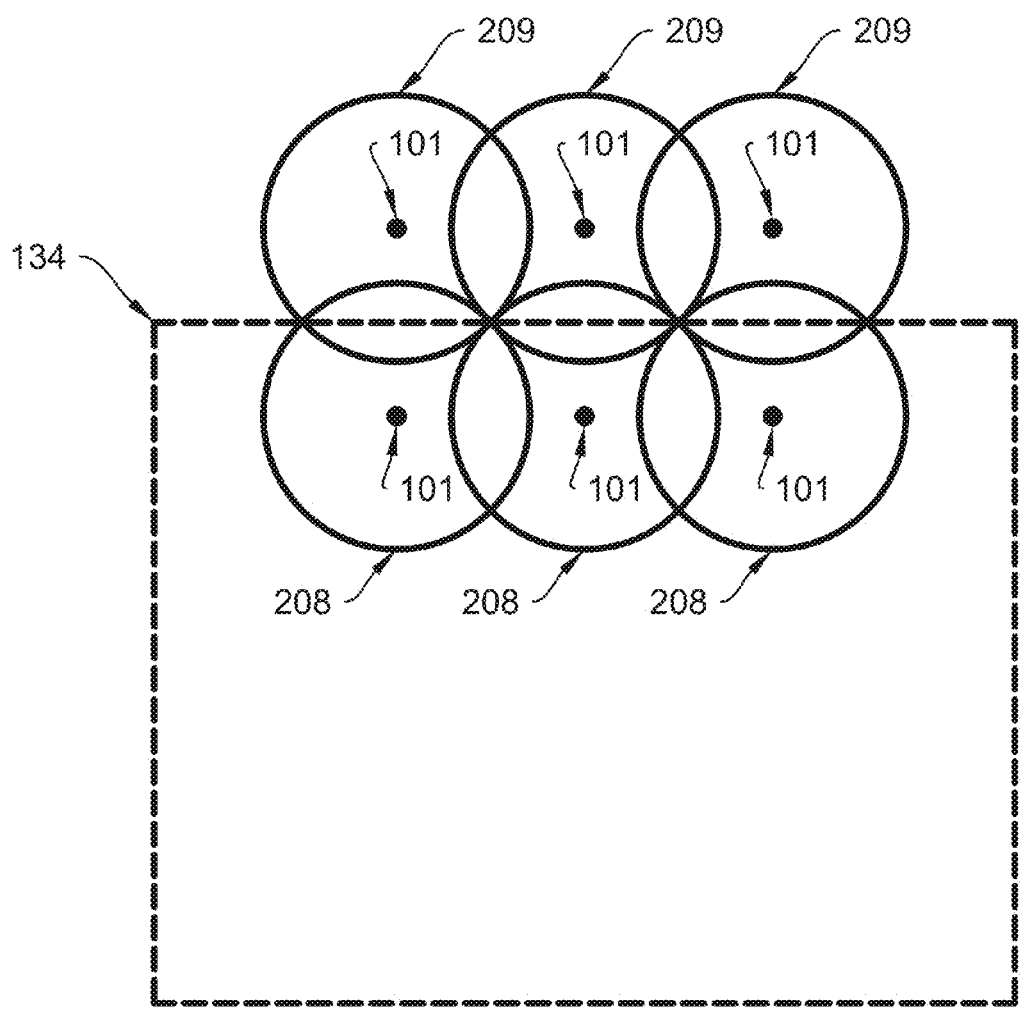
FIG. 16 is a diagrammatic depiction of overlapping activation and deactivation zones for consideration in connection with digital geographic distribution zone according to the present invention.

Referencing FIGS. 14-16, the reader will consider that the system preferably comprises a remote synchronization service (130) for synchronizing as at (133) and (137) (FIGS. 14 and 9) media and media libraries to multiple member devices as at (101). It preferably comprises a digital geographic distribution zone (134) with activation zones (208) within the zone (134) and deactivation zones (209) outside the zone (134) as generally depicted in FIG. 16.

The geographic distribution zone (34) may be preferably exemplified by (a) the reach of a wi-fi network, (b) GPS coordinates, (c) geographical areas defined by geographical boundaries such as streets, roads, city boundaries, etc., and/or (d) through the use of nodes transmitting radio frequencies defining a device's location (and determining whether it is beyond the physical boundaries or building construction of a retail outlet location or storefront) via triangulation (for example Bluetooth low energy can be used for this purpose).

Geographic limits can also be determined by using nodes emitting radio frequencies around the perimeter of the building, to determine whether a device is within the store limits or beyond them. The reader can reference FIG. 15 for additional details. In other words, a geographic distribution zone (134) may be preferably defined by some form of radio frequency-emitting node, either by limiting access to the reach of the nodes' radio waves (as in wi-fi) or by using some form of radio frequency to identify the position of a mobile device (within a building, or outside of it). Conceivably, a geographical area may be defined by cooperatively associating a plurality of nodes or locations interconnected in a dot-to-dot like manner for defining the boundaries of the geographical area.

The geographic distribution zone (134) is essentially a zone of privileged access to the media library of the merchant identified by the geographic distribution zone (134) and those users or members (10) within the zone (134) may be properly regarded as the user group (100). The system also preferably comprises mobile devices (101) with a client application, which synchronizes (137) with remote synchronization services (130) and is used to determine the limits of the geographic distribution zone (134), and further give or deny access to media based on the location of the device.

The system also interacts with transaction services (136), registering purchases and clearing transactions made on mobile devices (101) within the geographic distribution zone 34 and sending either purchased media or record of purchase to the remote synchronization services (130), which then distributes media to all linked devices (101). Thus, in the referenced FIGS. 14 and 15, a device as at 101 is given access as at (138) to the media of the zone (134) when it is at position (207) within zone (134). If the user decides to purchase media while in the geographic distribution zone (134), the request (139) is sent to the transaction/purchasing services (136). The transaction is then credited to the merchant who is identified with the geographic distribution zone (134) and the media or a record of purchase is sent to as at (140) the synchronization services (130) and then pushed to all linked devices (101).

A variant of the system would actually have the transaction (139) directed at the purchasing services of the merchant identified with the geographic distribution zone (134), and the merchants' services (136) then either notify the synchronization services (130) of the user's purchase, or transfer purchased media to the user's account within the synchronization service (130). The synchronization services (130) then transfer media to all linked devices. FIG. 15 is a diagram of the full system along with other sources (141) and (142), whereby sources (141) and (142) are possible retailers of either a brick and mortar type or digital type.

While the foregoing specifications set forth much specificity, the same should not be construed as setting forth limits to the invention but rather as setting forth certain preferred embodiments and features. For example, as prefaced hereinabove, it is contemplated that the present inventive system essentially provides a social broadcasting system for enabling members of a user group to rebroadcast select content to other members of the user group, and a group streaming system for enabling members of a user group to collaboratively curate content delivery.

The social broadcasting or rebroadcasting system according to the present invention is believed to essentially comprise, in combination certain synchronization means for real-time synchronization of media content among members of the user group and certain content rebroadcast means. The synchronization and content rebroadcast means are cooperable among a group of member clients as at (101) each of which are in communication with at least two content sources having differing parameters for judging efficiency of content delivery.

The synchronization means may be said to comprise certain means for identifying select content (as may be exemplified by file-matching means characterized by waveform metric analysis) and certain delivery direction means for directing delivery of the select content from a select optimal content resource location for each member client. In other words, the select optimal data resource locations for each member client are selected from the at least two content sources affiliated or communication with each member client (101).

The content rebroadcast means as exemplified by the VERTIGO branded server/application (51) prompts the delivery direction means to deliver the select content to members of the user group from a content origination member of the user group (i.e. the member (10) who initiates or activates the group share (e.g. by pressing a "share" button). The members of the user group are thereby able to (simultaneously) access the select content originating from the content origination member and as received from the select optimal content resource locations within the user group for the purpose of providing a content-based platform for social interaction among the members (10) of the group (100).

The at least two content sources may preferably comprise at least one indirect content source and a direct content source such that when querying which of the sources is most efficient, the system will govern that the most efficient source of the content to be delivered. Noting that the at least two content sources define at least two legal access points, the system further contemplates certain data-routing governance means in communication with the at least two separate legal access points for providing (a) industry rights management (b) compliance monitoring and/or (c) compliance reporting of content delivery.

Given the social nature of the systems, a dialogue platform is further contemplated for enabling members of the user group to engage in real-time dialogue regarding at least the select content. The dialogue platform may comprise any number of means for enabling communications, but is believed preferably practiced by way of certain means for overlaying live audio for enabling members of the user group to orally converse in real-time regarding at least the select content.

The systems further contemplate certain system activation means for activating said systems. The system activation means may be exemplified alternatively as being operable via member device re-orientation or made operable via select vehicular button-based means in communication with member communications means as may be exemplified by a member device (101). When defined by vehicular button-based means, said means may be preferably selected from the group consisting of hand-operable means and foot-operable means.

The social broadcasting system may further embrace the group streaming system at least insofar as it enables members of the user group to collaboratively curate content delivery. In this regard, the group streaming system contemplates certain means for collecting individual user content preferences, and certain further means for compiling a group curation profile based on the individual user content preferences. Certain additional means are contemplated for individually modifying the group curation profile after initial profile compilation or formation for optimizing content delivery to the user group.

The social broadcasting system need not be directed to members acquainted with one another but instead may be directed toward members located with a geographic distribution zone which zone is targeted for a broadcast stream. In this regard, it is contemplated that the social broadcasting system may comprise or utilize radio frequency emitting nodes to identify geographic boundaries of a targeted geographic distribution zone in order to create a streaming/digital marketplace within the geographic distribution zone. The geographic distribution zone may be preferably defined by a geographic location in order to create a streaming/digital virtual storefront within said geographic location.

Certain social broadcasting and group streaming methodologies are further contemplated as being supported by the foregoing specifications in tandem with the drawings submitted in support of these specifications. In this regard, a social broadcasting method according to the present invention enables members of a user group to broadcast select content to other members of the user group, and may be said to comprise the steps of receiving initially sourced content from an initial content provider at the group origination member device; querying whether the received initially sourced content is most efficiently sourced from the content provider; and sourcing most efficiently sourced content to the group origination member device.

The sourced content may then be shared with group member devices in communication with the group origination member device, which received sourced content is queried as to whether it is most efficiently sourced at each of the group member devices Most efficiently sourced content may then be further sourced to the group member devices. The steps of querying may preferably comprise the step(s) of file-matching synchronization, which file-matching synchronization steps preferably comprise the steps of analyzing waveform metrics for rendering a file match.

The group streaming method according to the present invention basically functions to enable members of a user group to collaboratively curate content delivery, and may be said to comprise the steps of: initiating a group stream by inviting potential members of a user group to join the user group; accepting invitations to the group stream by the potential members who thereby join the group stream and become members of the user group; individually and respectively inputting user preferences into a group curation compilation system; compiling the individually and respectively input user preferences into a group curation profile; and delivering content defined by the group curation profile to the members of the user group.

The members of the user group may refine the group curation profile by individually and respectively updating the group curation profile with periodic additional input thereby optimizing the group curation profile and delivery of content and further engage in dialogue regarding at least the delivered content, which dialogue is anticipated to have a marked effect on the group curation collaboration.

We claim:

1. A social broadcasting system for enabling members of a user group to synthetically broadcast select content to other members of the user group, the social broadcasting system comprising, in combination: a first non-transitory computer-implementable medium and a group of medium-processing computers associated with each of the members of the user group within an operable network, the first non-transitory computer-implementable medium being implementable via the group of medium-processing computers, the first non-transitory computer-implementable medium thereby being operable to effect real-time synchronization of media content among members of the user group and to synthetically broadcast content among the group of medium-processing computers each of which are in communication with at least two content sources, the at least two content sources each being characterized by a separate legal access point thereby providing at least two legal access points for the same content, the first non-transitory computer-implementable medium being operable to (a) identify select content and direct delivery of the select content from a select optimal content resource location associated with each medium-processing computer and (b) map content resources from amongst differing legal access points without redistributing sourced content, the select optimal content resource location being selected from the at least two content sources, said selection being based on user-defined parameters, the first non-transitory computer-implementable medium further directing delivery of the select content as initiated by content origination member of the user group by (a) establishing an instruction-passing second channel to each medium-processing computer over the operable network; (b) generating routing and playback instructions for governing playback of the select content via a content-delivery first channel; and (c) passing the routing and playback instructions to each medium-processing computer via the instruction-passing second channel for sourcing the select content for consumption, the members of the user group thereby being able to simultaneously access the select content as initiated by content origination member and received from the select optimal content resource locations within the user group for the purpose of providing a content-based platform for social interaction.

2. The social broadcasting system of claim 1 comprising a group streaming system for enabling members of the user group to collaboratively curate content delivery.

3. The social broadcasting system of claim 2 wherein the group streaming system collects individual user content preferences, and compiles a group curation profile based on the individual user content preferences.

4. The social broadcasting system of claim 3 wherein the first non-transitory computer-implementable medium enables the user to individually modify the group curation profile for optimizing content delivery to the user group.

5. The social broadcasting system of claim 1 wherein the members of the user group are grouped by way of a broadcast stream within a geographic distribution zone.

6. The social broadcasting system of claim 5 utilizing radio frequency emitting nodes to identify geographic boundaries of the geographic distribution zone in order to create a streaming/digital marketplace within said geographic distribution zone.

7. The social broadcasting system according to claim 6 wherein said geographic distribution zone is defined by a geographic location in order to create a streaming/digital virtual storefront within said geographic location.

8. The social broadcasting system of claim 1 wherein the at least two content sources comprise at least one indirect content source and a direct content source.

9. The social broadcasting system of claim 8 comprising a data-routing compliance appliance in communication with the at least two separate legal access points for providing (a) industry rights management (b) compliance monitoring and/or (c) compliance reporting of content delivery as delivered from either of a primary legal access point or at least one secondary legal access point.

10. The social broadcasting system of claim 1 comprising a dialogue platform, the dialogue platform enabling members of the user group to engage in real-time dialogue regarding at least the select content.

11. The social broadcasting system of claim 10 wherein the dialogue platform comprises an audio overlay means for overlaying live audio and enabling members of the user group to orally converse in real-time regarding at least the select content.

12. The social broadcasting system of claim 1 comprising a system activation mechanism for activating the social broadcasting system, the system activation mechanism being defined by (a) device re-orientation for activating the social broadcasting system, or (b) a select vehicular button for activating the social broadcasting system.

13. The social broadcasting system of claim 12 wherein the select vehicular button is selected from the group consisting of a hand-operable button and a foot-operable button means.

14. A social broadcasting method for enabling members of a user group to synthetically broadcast select content to other members of the user group, the members of the user group each having access to a medium-processing computer, the social broadcasting method comprising the steps of: establishing an instruction-passing second channel to each medium-processing computer over an operable network via a first non-transitory computer-implementable medium made operable via medium-processing computers; generating routing and playback instructions at each medium-processing computer over the operable network via the first non-transitory computer-implementable medium, the routing and playback instructions for governing playback of the select content via a content-delivery first channel; passing the routing and playback instructions to each medium-processing computer via the instruction-passing second channel; sharing sourced content with content-receiving members of the user group via a group origination member;

querying whether the shared sourced content is most efficiently sourced at each of the medium-processing computers associated with the content-receiving members; and sourcing content to each of the medium-processing computers associated with the content-receiving members from an optimal secondary content source selected from at least two secondary content sources in communication with each medium-processing computer associated with the content-receiving computers via the first non-transitory computer-implementable medium, each secondary content source being characterized by a separate secondary legal access point, said source selection being based on individually-defined parameters; mapping content resources from amongst differing legal access points without redistributing sourced content; and simultaneously accessing the select content by the members of the user group as initiated by the content origination member and received from the select optimal content resource locations by the content-receiving members within the user group for the purpose of providing a content-based platform for social interaction.

15. The social broadcasting method of claim 14 comprising the step of collaboratively curating sourced content via a group curation profile.

16. The social broadcasting method of claim 15 comprising the step of collecting individual user content preferences, and compiling the group curation profile based on the individual user content preferences.

17. The social broadcasting method of claim 16 comprising the step of individually modifying the group curation profile for optimizing sourced content delivery to the user group.

18. The social broadcasting method of claim 14 comprising the step of governing industry rights according to variously sourced content, the variously sourced content being delivered from either of a primary legal access point or at least one secondary legal access point.

19. The social broadcasting method of claim 18 wherein the step of governing industry rights comprises the steps of compliance monitoring and/or compliance reporting of sourced content.

20. The social broadcasting method of claim 14 wherein the querying step comprises the step of file-matching synchronization.

21. The social broadcasting method of claim 20 wherein the step of file-matching synchronization comprises the step of analyzing waveform metrics for rendering a file match.

22. The social broadcasting method of claim 14 comprising the following steps before the step of sharing sourced content with the medium-processing computers associated with the content-receiving members: receiving initially sourced content from an initial content provider at the medium-processing computer associated with the group origination member; querying whether the received initially sourced content is most efficiently sourced from the initial content provider at the medium-processing computer associated with the group origination member; and sourcing content to the medium-processing computer associated with the group origination member from an optimal primary content source selected from at least two primary content sources in communication with the medium-processing computer associated with the group origination member, each primary content source being characterized by a separate primary legal access point, said source selection being based on individually-defined parameters.

23. The social broadcasting method of claim 14 comprising the step of dialoguing among members of the user group regarding at least the sourced content.

* * * * *

UNITED STATES PATENT AND TRADEMARK OFFICE
CERTIFICATE OF CORRECTION

PATENT NO. : 10,116,616 B2
APPLICATION NO. : 15/305977
DATED : October 30, 2018
INVENTOR(S) : Alexander Savenok et al.

It is certified that error appears in the above-identified patent and that said Letters Patent is hereby corrected as shown below:

On the Title Page

Immediately preceding item (51), please insert the following:
--Related U.S. Application Data
(60) Provisional application No. 61/983,160, filed on April 23, 2014.--

In the Specification

Column 1, Lines 8-30, delete the entire paragraph immediately following the heading "PRIOR HISTORY" and replace with --This U.S. patent application is a 371 national stage entry of International Patent Application No. PCT/US2015/027311, which International Patent Application claims the benefit of or priority to U.S. Provisional Patent Application No. 61/983,160 filed in the United States Patent and Trademark Office (USPTO) on 23 Apr. 2014. This U.S. patent application is also related to International Patent Application No. PCT/US2014/069067 filed in the USPTO as international receiving office on 8 Dec. 2014, and International Patent Application No. PCT/US2015/019099 filed in the USPTO as international receiving office on 6 Mar. 2015, which latter application claimed priority to U.S. Provisional Patent Application No. 61/949,493 filed in the United States Patent and Trademark Office (USPTO) on 7 Mar. 2014, which provisional patent application is related to U.S. patent application Ser. No. 13/199,474 ('474 application), filed in the USPTO on 30 Aug. 2011, now issued as U.S. Pat. No. 8,688,631; U.S. patent application Ser. No. 13/134,044 ('044 application), filed in the USPTO on 26 May 2011, now issued as U.S. Pat. No. 8,478,719; and U.S. patent application Ser. No. 13/065,254 ('254 application), filed in the USPTO on 17 Mar. 2011, now issued U.S. Pat. No. 8,589,171. The entire disclosures of each of the above-mentioned prior-filed applications are hereby incorporated by reference thereto so far as allowable.--

Signed and Sealed this
Tenth Day of December, 2024

Katherine Kelly Vidal
*Director of the United States Patent and Trademark Office*